Oct. 11, 1927.
G. LEWINNEK
1,645,064
VENTILATION OF DYNAMO ELECTRIC MACHINES
Filed Oct. 26, 1925
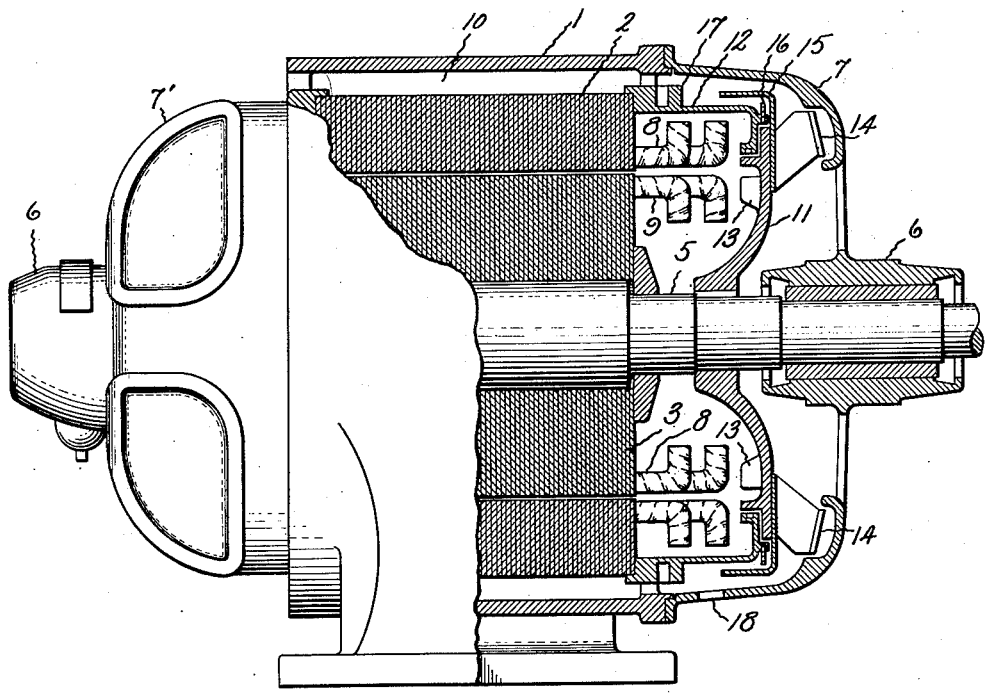
Inventor:
Georg Lewinnek,
by
His Attorney.

Patented Oct. 11, 1927.

1,645,064

UNITED STATES PATENT OFFICE.

GEORG LEWINNEK, OF BERLIN, GERMANY, ASSIGNOR TO GENERAL ELECTRIC COMPANY, A CORPORATION OF NEW YORK.

VENTILATION OF DYNAMO-ELECTRIC MACHINES.

Application filed October 26, 1925, Serial No. 64,892, and in Germany November 15, 1924.

My invention relates to the ventilation of dynamo electric machines, and particularly to the ventilation of electric motors of the enclosed type.

In a dynamo electric machine whose current carrying parts are enclosed partially or wholly from a blast of cooling medium circulated through its frame, foreign fluid materials present in the cooling medium are often carried past the enclosing barrier into the interior of the machine. In accordance with the present invention this leakage of foreign liquid in the ventilating medium into the interior of the machine is prevented by providing a running joint between the enclosing barrier and the frame of the machine through which the foreign material can not readily pass.

When such a machine is set up in the open, rain water may be carried along into the interior of the machine by the cooling air supplied to the machine. In most cases the free entrance of this water is prevented by inserting baffles in the pipe or orifices supplying air to the machine upon which any water in the air is precipitated. In practice, however, it has been found that this means alone does not suffice, since water will frequently collect in the interior of the supply pipe and penetrate into the compartment enclosing the current carrying parts. In accordance with the present invention this objection is entirely overcome.

The various features of novelty which characterize my invention are pointed out with particularity in the claims annexed to and forming a part of this specification. For a better understanding of my invention reference may be had to the following description taken in connection with the accompanying drawing, in which the single figure is a side view, partly in section, of an electric motor embodying my invention.

In the motor construction shown, 1 designates a frame that encloses and supports a stator 2. A rotor 3 is located within this stator and supported by a shaft 5 in bearings 6, carried by end plates 7 and 7' attached to the frame of the machine. 8 and 9 indicate respectively portions of the stator and rotor windings. The frame 1 is provided with a plurality of spaced longitudinal ventilating ducts 10, located in the frame at the outside surface of the stator member 2.

The annular plate 11 mounted on the shaft 5 cooperates with an annular extension 12 of stator frame 1 to enclose, together with the stator member 2 and a suitable enclosing means at the other end of the frame, the winding carrying portions of the machine. The extension 12 has an inturned end closely adjacent the plate 11. This enclosing means may be another annular plate similar to the one shown at 11 or it may be as shown, a solid end plate or an end plate with covers. The compartment thus formed is cooled by ventilating fans 13 located on the inside surface of the plate 11. The outside surface of this plate also carries fan elements 14 which draw air in through openings in the end shell 7 and supply the same to the ventilating ducts 10. Fastened to the outside portion of plate 11 there is a flange 15 that extends toward the motor interior to surround and enclose a stationary baffle ring 16 secured to a portion of the machine frame 12. Baffle ring 16 might be dispensed with by suitably proportioning the frame of the machine.

The cooling medium, in most instances air, is sucked in by the ventilator comprising plate 11 and fans 14, through the openings in the end shell 7 and the cooling stream is directed over ring 16 by flange 15. Any fluid present in the medium and precipitated therefrom on projecting surfaces of the machine frame, such as 17, is prevented from entering the compartment formed in the motor by the cooperation of flange 15 and baffle ring 16. In case liquid is entrained in the cooling air and drawn into the shell 7 it will be prevented from entering the inside of extension 12 by the action of flange 15 and baffle ring 16. Any liquid precipitated on the nearby portions of the frame or any condensed vapor forming thereon will be conducted around the frame to an appropriate discharge opening 18.

Baffles according to my invention may be supplied to any type of machine where it is desirable to prevent the entry of a liquid precipitated from a gaseous cooling medium into the interior of a winding compartment such as is often found desirable in certain types of enclosed dynamo electric machines. My construction might if desired be used at both ends of the motor.

What I claim as new and desire to secure by Letters Patent of the United States, is,—

1. In a dynamo-electric machine, a rotor, a stator frame having an annular extension, means cooperating with said extension to form a closed chamber inside the stator frame including a plate carried by said rotor having a flange spaced from and surrounding said extension to deflect air away from the space therebetween, means including a fan for directing air over said flange and around said chamber, and means carried by the rotor for circulating air inside said closed chamber.

2. In a dynamo-electric machine, a rotor, a stator frame having an annular extension, means cooperating with said extension to form a closed chamber inside the stator frame including a plate carried by said rotor having a flange spaced from and surrounding said extension to deflect air away from the space therebetween, a shell having an air inlet and supported on the frame to direct air over said flange and around said chamber, a fan for circulating air through said shell, and means carried by the rotor for circulating air inside said closed chamber.

3. In a dynamo-electric machine, a rotor, a stator frame having an annular extension, means cooperating with said extension to form a closed chamber inside the frame including a plate carried by said rotor having a flange spaced from and surrounding said extension and a baffle between said extension and said flange, a shell having an air inlet and supported on the frame to direct air over said flange and around said chamber, a fan for forcing air through said shell, and means carried by the rotor for circulating air inside said closed chamber.

4. In a dynamo-electric machine, a rotor, a stator frame, an annular extension on said frame having an inturned end, means cooperating with said extension to form a closed chamber inside the frame including a plate carried by said rotor having a flange spaced from and surrounding said extension, a shell having an air inlet and supported on the frame to direct air over said flange and around said chamber, a fan for forcing air through said shell, and means carried by the rotor for circulating air inside said closed chamber.

5. In a dynamo-electric machine, a rotor, a stator frame, an annular extension on said frame having an inturned end, means cooperating with said extension to form a closed chamber inside the frame including a plate carried by said rotor having a flange spaced from and surrounding said extension and a baffle between said extension and said flange, a shell having an air inlet and supported on the frame to direct air over said flange and around said chamber, a fan for forcing air through said shell, and means for circulating air inside said closed chamber.

In witness whereof, I have hereunto set my hand.

GEORG LEWINNEK.